United States Patent
Srinivasan et al.

(10) Patent No.: US 7,139,199 B2
(45) Date of Patent: Nov. 21, 2006

(54) FLASH MEMORY FILE SYSTEM WITH TRANSACTED OPERATIONS

(75) Inventors: Sujaya Srinivasan, Folsom, CA (US); John C. Rudelic, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/878,237

(22) Filed: Jun. 28, 2004

(65) Prior Publication Data

US 2005/0286306 A1 Dec. 29, 2005

(51) Int. Cl.
*G11C 11/34* (2006.01)

(52) U.S. Cl. .................. 365/185.22; 365/185.03; 365/185.33

(58) Field of Classification Search .......... 365/185.33, 365/185.03, 185.11, 185.22; 711/165; 707/205, 707/200
See application file for complete search history.

(56) References Cited

U.S. PATENT DOCUMENTS

| 6,262,918 B1* | 7/2001 | Estakhri et al. ........ 365/185.33 |
| 6,938,140 B1* | 8/2005 | Louie et al. ................ 711/165 |
| 6,966,490 B1* | 11/2005 | Murayama et al. ......... 235/382 |

* cited by examiner

*Primary Examiner*—Anh Phung
*Assistant Examiner*—Pho M. Luu
(74) *Attorney, Agent, or Firm*—LeMoine Patent Services, PLLC (57) ABSTRACT

A flash memory file system logically divides at least a portion of the flash memory into memory fragments and headers associated with the memory fragments. The flash memory file system also includes a transaction information structure in support of transacted operations. The transaction information structure includes fields to indicate whether a transaction has begun, whether commitment of the transaction has begun, and whether commitment of the transaction has been completed. File system operations may be rolled back if a transaction was interrupted.

24 Claims, 7 Drawing Sheets

FLASH MEMORY FILE SYSTEM WITH TRANSACTED OPERATIONS

FIELD

The present invention relates generally to file systems, and more specifically to file systems in flash memory devices.

BACKGROUND

Flash memories may have file systems to hold files. Because flash memories are nonvolatile, files in a flash memory should be available after power to the flash memory is cycled. If power is lost when a file in a flash memory is being modified, the file may be corrupt when power is restored.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
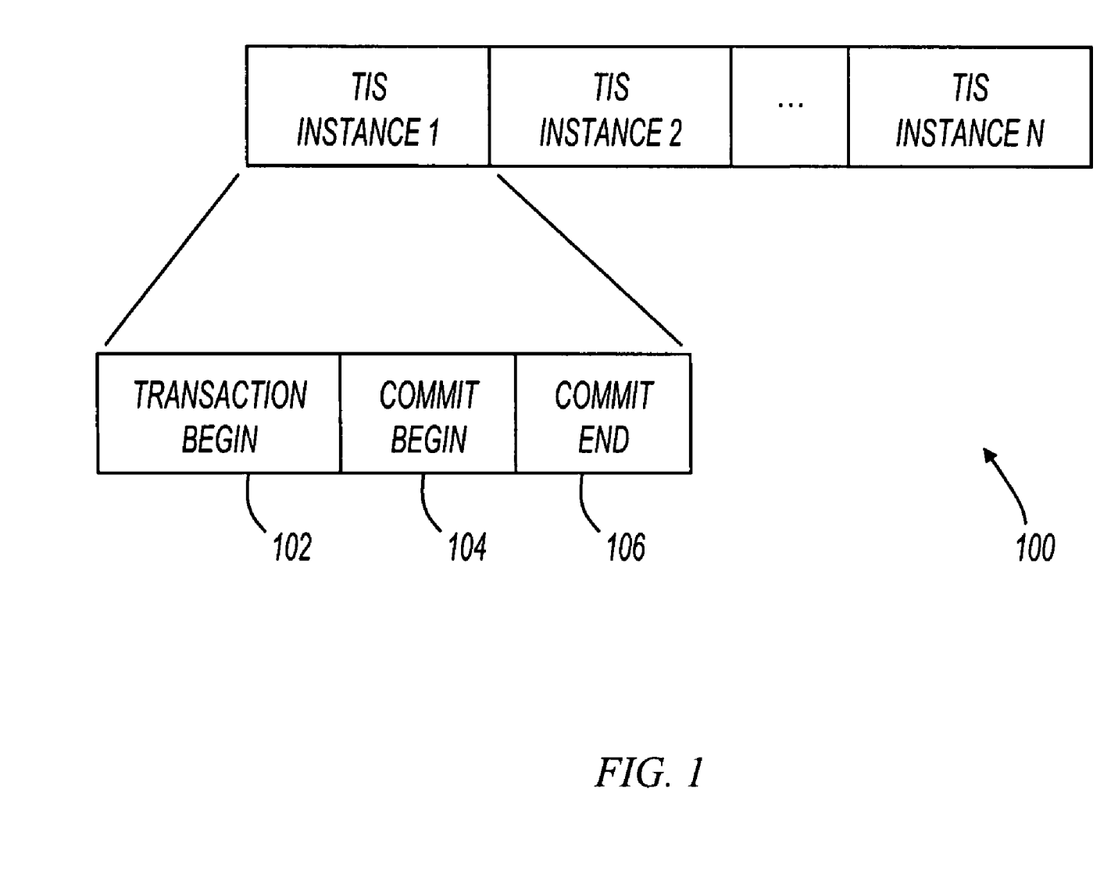
FIG. 1 shows a diagram of transaction information structure instances.

FIG. 1 shows a diagram of transaction information structure (TIS) instances. As shown in FIG. 1, a TIS instance is a data structure that includes at least three fields: a transaction begin field 102, a commit begin field 104, and a commit end field 106. FIG. 1 shows N transaction information structure instances. Any number of instances may be present. As used herein, the acronym "TIS" may refer to a definition of a transaction information structure, a number of transaction information structure instances, or a particular transaction information structure instance.

In some embodiments, one or more TIS instances are maintained in a flash memory file system to support transacted operations in a file. For example, a TIS may be kept in a file information structure that is stored in flash memory. The file information structure may also maintain other information describing a file, or relating to a file, such as the filename, creation date, size of the file and the location of a sequence table that references the actual file data.

A single write to a file may be an append, truncate, or overwrite of one or more file fragments. A transaction may include a combination of these operations in any order. For example, a transaction may include an append to the end of a file, followed by an overwrite in the middle of the file, followed by an overwrite in the beginning of the file, or any combination.

Flash memory is generally erased prior to writing, and erasing operations are generally performed on multiple locations at once, depending on the underlying architecture of the memory device. Erasing a flash memory is the equivalent of storing a "1" in every location, and when writing to the flash memory, locations are either left as a "1," or changed from a "1" to a "0." Once programmed with a "0," the location may not be written with a "1" without erasing a number of locations. The use herein of "0" and "1" may or many not follow standard convention, and is somewhat arbitrary because an erased location may be considered as holding a "0" and a programmed location may be considered as holding a "1." In some embodiments, the term "setting a bit" may refer to programming a single bit location, regardless of whether is it considered as changing a "1" to a "0" or a "0" to a "1."

The flash memory erasing and programming operations described in the previous paragraph lead to special considerations when performing transacted operations. For example, because a single location in flash memory typically cannot be overwritten, changes to files in flash memory may be performed by writing new file fragments to replace old file fragments, rather than simply overwriting the old file fragments. Further, when maintained in flash memory, each field in a TIS may be written to only once between erase operations. In some embodiments, each field in a TIS consists of a single bit, and writing to the field corresponds to setting a single bit.

Transaction information structures support a transaction capability in flash file systems, to enable them to either commit or roll back a number of operations that have been made. For example, a database may perform file operations that modify several pieces of a file, and to avoid corruption of the database, the file system performs either all of the file operations or none of the file operations. If the file operations are left partially complete, the database may be left corrupted.

The transaction capability provided in part by TIS instances 100 may provide file system services in the event of a flash memory power loss. For example, if power is lost during a transacted operation, TIS instances 100 provide a mechanism to help the file system recover by "rolling back" all operations that were part of the transaction, to leave the file system in the state that existed before the operations started. Transaction information structures 100 provide fields stored in the flash memory describing the state of the transaction, so that the file system initialization is aware that a transaction was in progress and how to roll back.

Each TIS instance provides a transaction begin field that when set signifies that a transaction has begun. Each TIS instance also provides a commit begin field that when set signifies that all operations associated with the transaction have been completed, and that they may be committed. All file operations that are performed between setting the transaction begin field and the commit begin field are part of a transaction. In some embodiments, only one transaction is allowed on a single file at a time, but transactions on different files may be in progress at the same time.

A file system may provide a mechanism for an application to set the various fields in a TIS instance. For example, a file system may allow an application to set a transaction begin field using a "transaction begin command" or procedure call in an applications programming interface (API). Further, a file system may allow an application to set a commit begin field using a "transaction end command" or procedure in an API. In some embodiments, the file system provides a transaction begin command and a transaction end command to set the transaction begin field and the commit begin field, respectively, and the file system handles setting the commit end field without intervention by the application.

In operation, an application may issue a transaction begin command, and the file system sets the transaction begin field of a TIS instance. Then the various operations that are part of the transaction may be issued by the application. The file system keeps all the old data valid until the transaction is completed, since it might need to roll back the changes. The new data that is part of the operations in the transaction are kept in an unfinished state. When the application issues a transaction end command, the file system sets the commit begin field in the TIS instance, which indicates that the file system will now begin committing the changes. Committing the changes may include operations such as validating all the new data and invalidating any old data. Once the changes are committed, the file system sets the commit end field in the TIS instance. An example transaction is described below with reference to FIGS. 2–5.

In the case of a power loss, a recovery process may include an initialization routine to check any TIS instances for incomplete transactions. If a transaction is found that is incomplete, then the transaction may be rolled back. For example, if a transaction begin field is set in a TIS instance, and the commit begin field is not set in the same TIS instance, then the initialization routine may roll back the changes by setting the commit end field in the TIS instance. If a transaction is found that is complete, but is not fully committed, the initialization routine may finish committing the transaction. For example, if a transaction begin field and a commit begin field are set in a TIS instance without the commit end field set, then the initialization routine may finish committing the transaction and set the commit end field. Various operations that may be performed as part of a recovery process are described further below with reference to FIG. 6.

Figure 2:
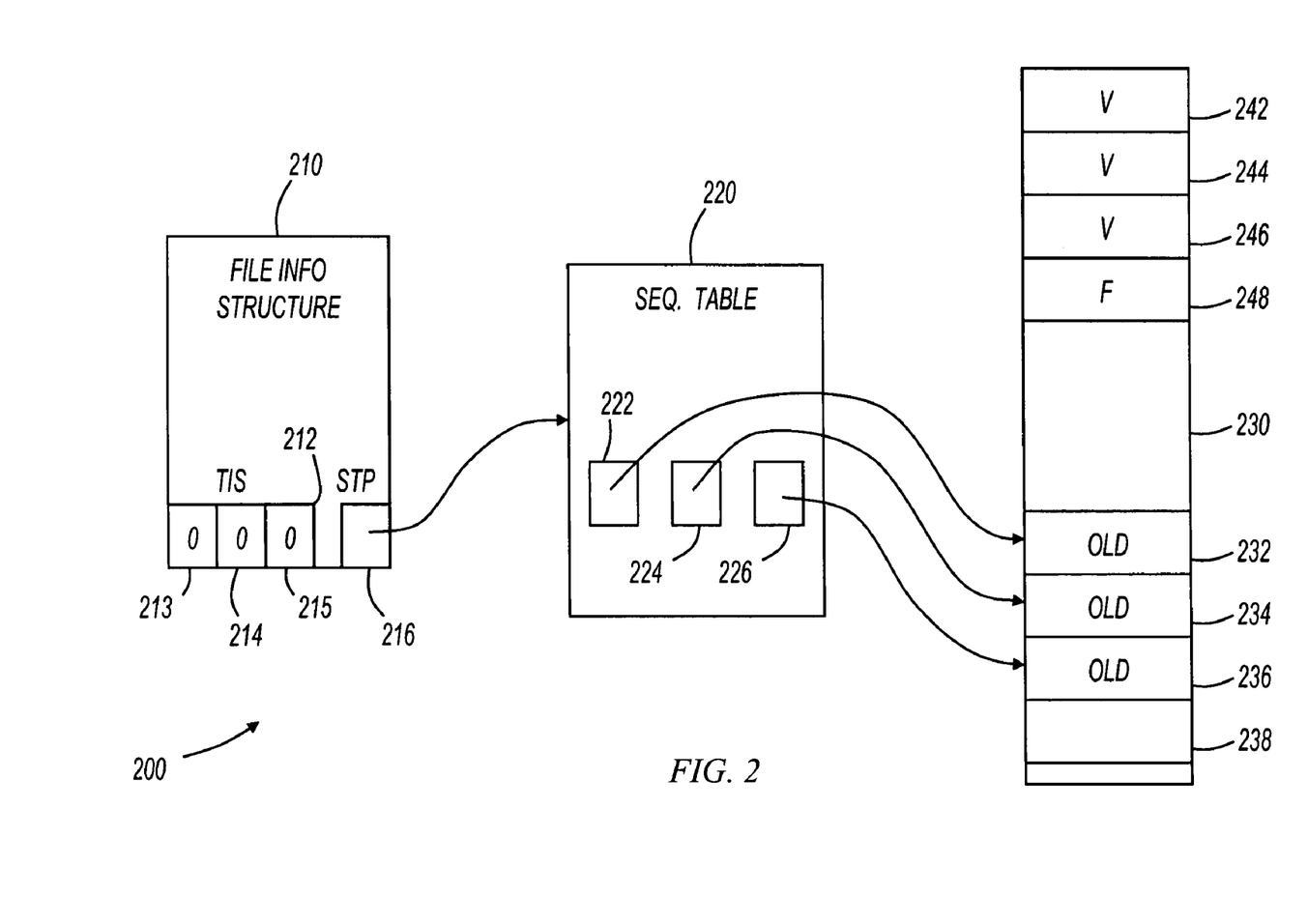
FIGS. 2–5 show the progress of a transacted operation in a flash memory.

FIGS. 2–5 show the progress of a transacted operation in a flash memory. As shown in FIG. 2, flash memory 200 includes a file information structure 210, sequence table 220, and memory 230. File information structure 210 includes a transaction information structure (TIS) 212, and a sequence table pointer (STP) 216. Transaction information structure 212 includes transaction begin field 213, commit begin field 214, and commit end field 215. In embodiments represented by FIG. 2, each of transaction begin field 213, commit begin field 214, and commit end field 215 include one bit of information. They are shown in an erased state, which is represented by a "0" in FIG. 2. File information structure 210 may include more information than is shown in FIG. 2. For example, file information structure 210 may include the filename, creation date, size of the file, or any other information relating the file in flash memory.

Sequence table pointer 216 includes a pointer to sequence table 220. Sequence table 220 includes sequence table entries 222, 224, and 226. Sequence table entries 222, 224, and 226 point to memory fragments that hold file data. By traversing the entries in sequence table 220, the file in flash memory 200 may be read.

Memory 230 includes memory fragments 232, 234, 236, and 238, and also includes headers 242, 244, 246, and 248 associated with the memory fragments. For example, header 242 is associated with memory fragment 232, header 244 is associated with memory fragment 234, header 246 is associated with memory fragment 236, and header 248 is associated with memory fragment 238. Memory 230 is shown with four memory fragments, but this is not a limitation of the present invention. A file may include data held in any number of memory fragments, and each of the memory fragments may have a header associated therewith. A memory fragment may be any size. In some embodiments, a memory fragment may be a few bytes in size, and in other embodiments, a memory fragment may be a few kilobytes in size. A memory fragment size may be chosen based on many possible factors, including the type of data expected to be stored therein, and the frequency with which it is expected to be changed.

Headers in memory 230 have a field to indicate a status of the associated memory fragment. For example, in some embodiments, each header may be marked to indicate whether a memory fragment is valid, invalid, allocating, or free. As shown in FIG. 2, headers 242, 244, and 246 are marked to show that memory fragments 232, 234, and 236 are valid; and header 248 is marked to show that memory fragment 248 is free.

File information structure 210, sequence table 220 and memory 230 are shown as separate blocks in FIG. 2. In some embodiments, file information structure 210, sequence table 220, and memory 230 are included in a common block of flash memory within a single flash memory device. In these embodiments, an erase operation will erase all of file information structure 210, sequence table 220, and memory 230 at the same time. In other embodiments, file information structure 210, sequence table 220, and memory 230 are distributed across multiple blocks within one or more flash memory devices. In these embodiments, an erase operation may erase a portion of the blocks shown in FIG. 2.

The structure shown in FIG. 2 represents a single file in a flash file system held in flash memory before a transaction begins. The file includes data shown as "OLD" in three memory fragments 232, 234, and 236, and each of memory fragments 232, 234, and 236 has an associated header marked as valid. When sequence table 220 is traversed to read the file, each of memory fragments 232, 234, and 236 is treated as having valid file data because the associated headers are marked as valid.

Figure 3:
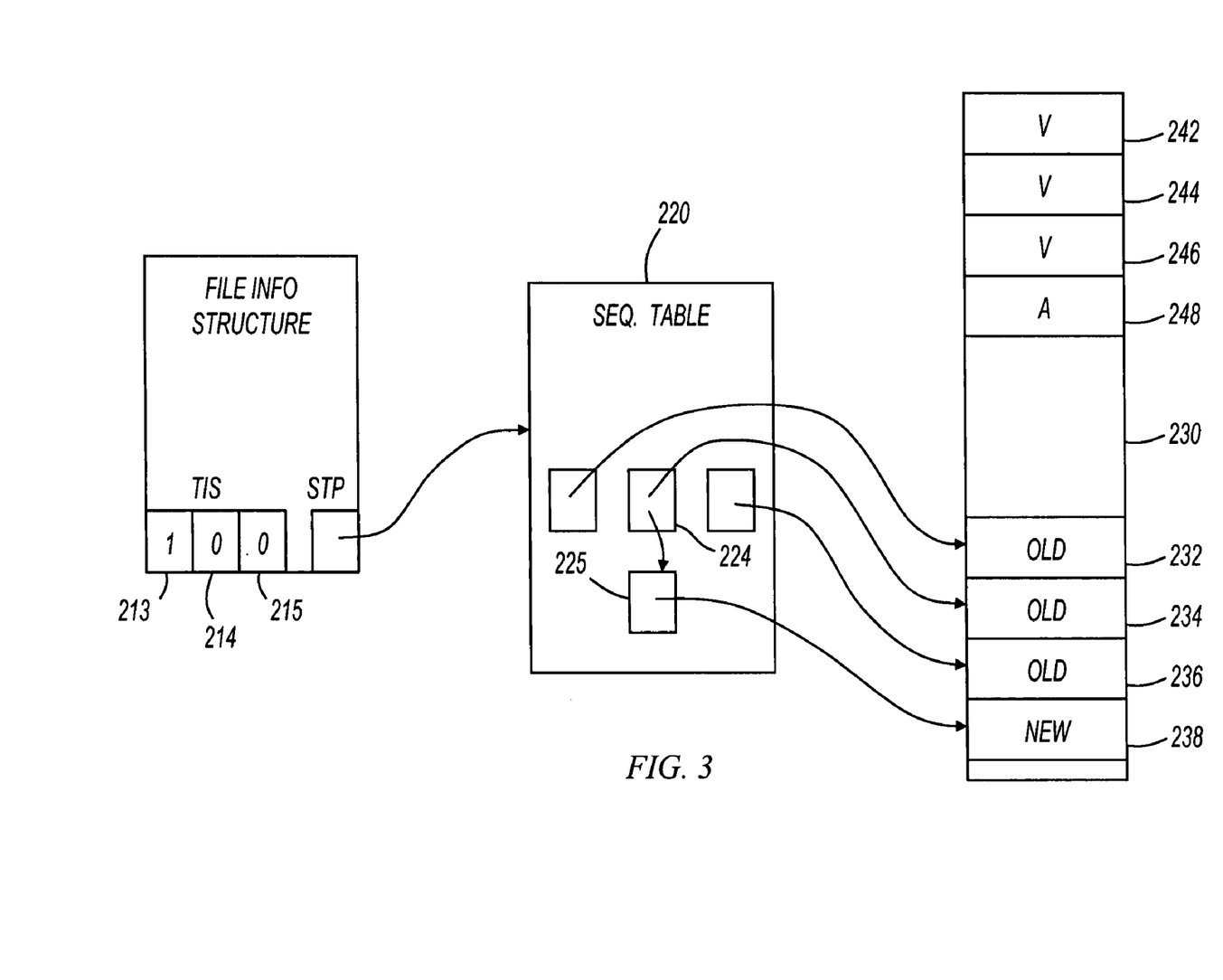
Figure 4:
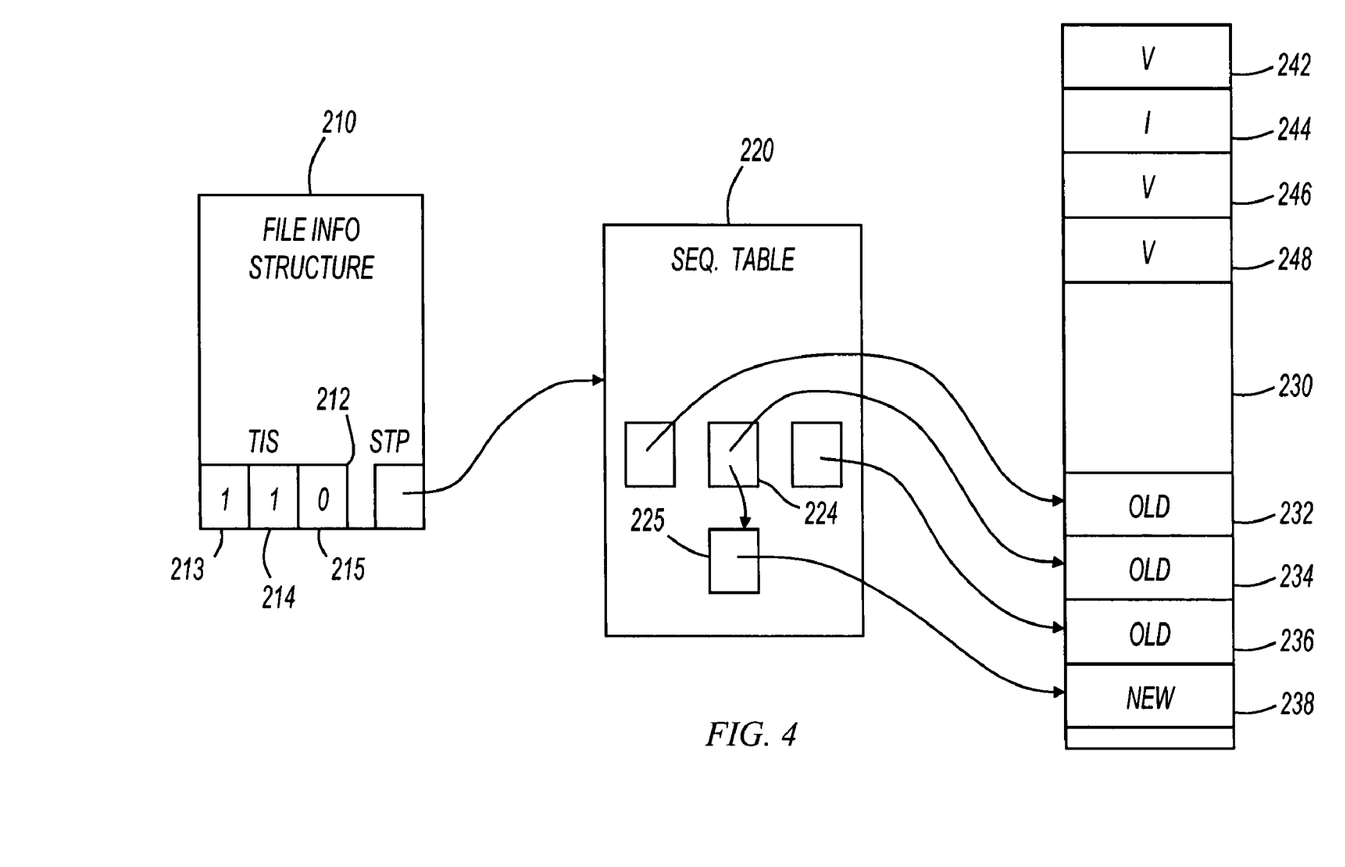
Figure 5:
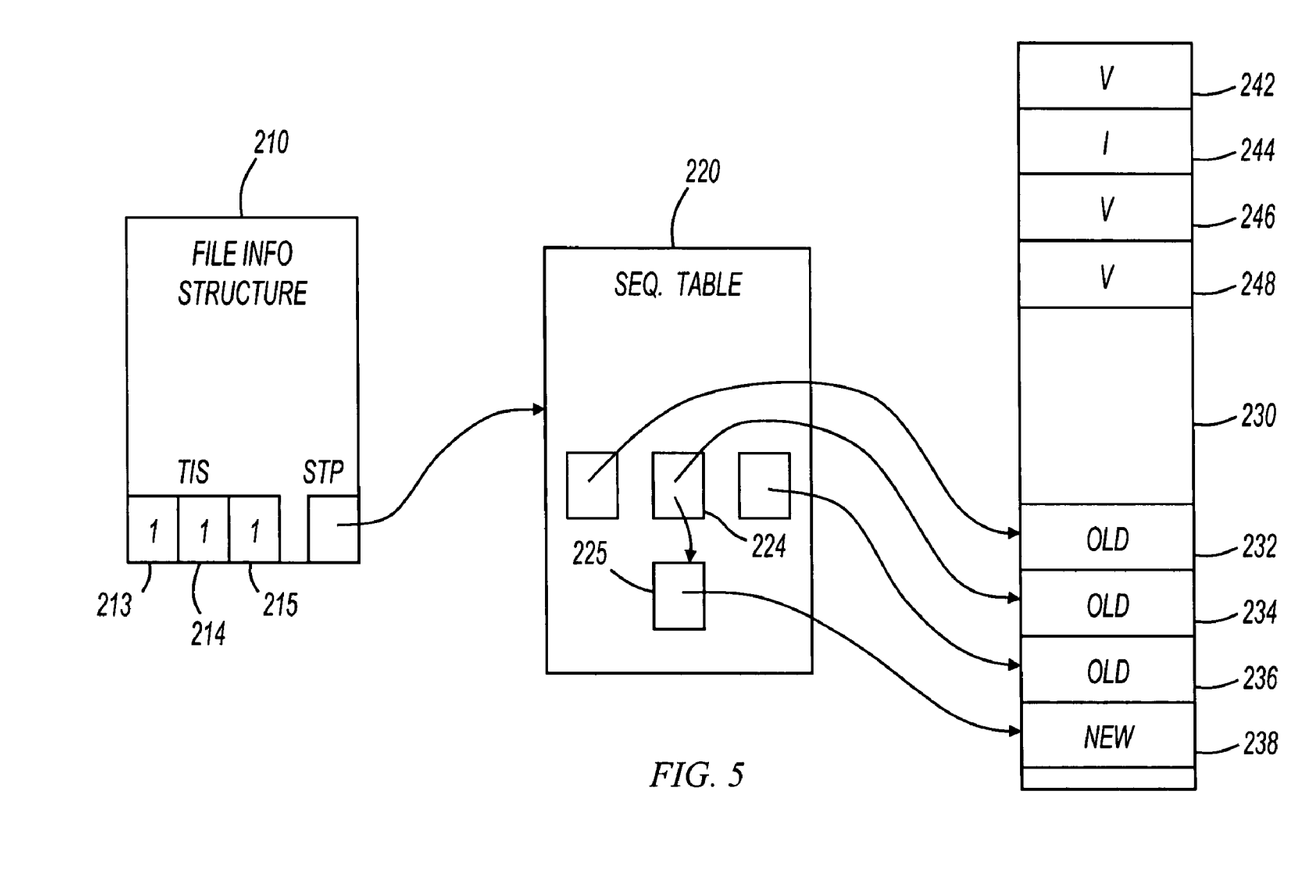

Transaction information structure 212 is shown with all three fields erased. Transaction begin field 213 is not set, indicating that a transaction has not yet begun. FIGS. 3–5 show the progression of a transaction in memory 200, starting at the state shown in FIG. 2.

As shown in FIG. 3, transaction begin field 213 is set. This indicates that a transaction will be started. In this example transaction, a portion of the file will be overwritten. The data that will be overwritten is included in memory fragment 234. To overwrite the file data in memory fragment 234, a new memory fragment will be written that includes the changed and unchanged portions of fragment 234. Memory fragment 238 is identified as a free memory fragment (shown at 248 in FIG. 2), and the new data is written into memory fragment 238. Header 248 is marked as allocating (shown by "A" in FIG. 3).

Sequence table entry 225 is added to sequence table 220, and sequence table entry 224 is modified to point to sequence table entry 225. Sequence table entry 225 is modified to point to the new memory fragment 238. Sequence table entry 225 is a "replacement entry" that will ultimately replace sequence table entry 224. In some embodiments, each sequence table entry includes a field reserved for pointing to a future replacement entry. This field may be written once when the replacement entry is created. The sequence table entries may be co-located as shown in FIG. 3, or may not be co-located. For example, sequence table entry 225 may be located in a region of memory far removed from the remainder of sequence table 220.

At this point, the transaction is partially complete. The transaction may or may not include more operations. Until the commit begin field 214 is set, the transaction is considered to be in process. Further, the old data is still marked as valid, and the new data is marked as allocating, so if necessary, the change to the file may be rolled back.

FIG. 4 shows the transaction complete and partially committed. Commit begin field 214 has been set, but commit end field 215 has not been set. Memory fragment 234 has been marked as invalid by changing header 244, and memory fragment 238 has been marked as valid by changing header 248. In general, after the commit begin field is set, all operations in the transaction are committed by invalidating old memory fragments that are to be replaced, and validating all new memory fragments, whether they are replacement memory fragmentss or new memory fragments that were added to the file.

FIG. 5 shows the transaction completed and committed. The only difference between FIG. 4 and FIG. 5 is the state of the commit end field in TIS 212. After the commit end field is set, the transaction is complete and has been committed. As shown in FIG. 5, even though a change has been made to the file, the history of the change is maintained because the old memory fragment still exists. In some embodiments, the history information may be used by the file system to recover previous versions of the file.

Figure 6:
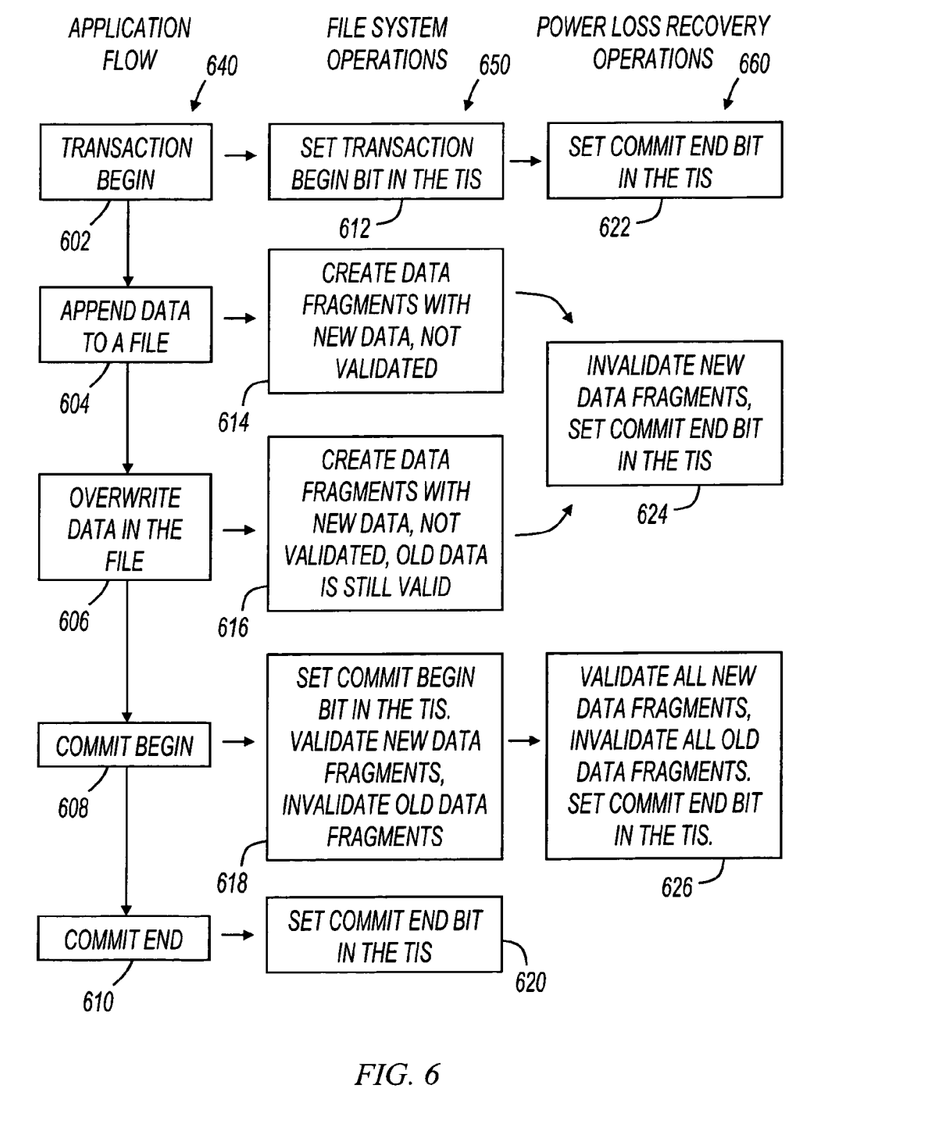
FIG. 6 shows a flowchart in accordance with various embodiments of the present invention.

FIG. 6 shows a flowchart in accordance with various embodiments of the present invention. In some embodiments, method 600, or portions thereof, is performed by an application, a flash memory file system, or an initialization routine, embodiments of which are described with reference to the various figures. In some embodiments method 600 or portions thereof is performed in software by a microcontroller within an electronic system or a memory device. Method 600 is not limited by the particular type of apparatus or software element performing the method. The various actions in method 600 may be performed in the order presented, or may be performed in a different order. Further, in some embodiments, some actions listed in FIG. 6 are omitted from method 600.

Method 600 is shown with application flow 640, file system operations 650, and power loss recovery operations 660. Application flow 640 includes blocks 602, 604, 606, 608, and 610. File system operations 650 includes blocks 612, 614, 616, 618, and 620. Power loss recovery operations 660 includes blocks 622, 624, and 626. Application flow 640 is arranged top down in FIG. 6 to show possible transacted file operations. For example, in some embodiments, application flow 640 corresponds to the transacted file operations described above which reference to FIGS. 2–5.

File system operations 650 are shown corresponding to blocks in application flow 640. Each block in file system operations 650 provides an example operation that may be performed in the file system corresponding to an operation performed at the application level. Power loss recovery operations 660 represent operations that may be performed by an initialization routine when recovering from a partially completed transaction.

At 602, an application may begin a transaction. In some embodiments, this may correspond to an application program issuing a transaction begin command or performing a procedure call within an application programming interface. At file system operation 612, the flash file system may set the transaction begin bit in a TIS instance in response to the transaction beginning at 602. If power were lost with the file system in this state, upon power recovery, an initialization routine may set a commit end bit in the TIS at 622. By setting the commit end bit, the initialization routine marks the transaction as having been committed without actually performing the transaction. In doing so, the file in the flash file system is not left in an intermediate state.

At 604, an application may append data to a file. In some embodiments, this may correspond to an application program requesting that the file system write data to the end of the file. At file system operation 614, the flash file system may create memory fragments with new data, without validating the new memory fragments. For example, new memory fragments may be created by marking their associated headers as allocating. If power were lost with the file system in this state, upon power recovery, an initialization routine may invalidate the new memory fragments and set the commit end bit in the TIS at 624. The new memory fragments may be invalidated by marking their associated headers as invalid. This is an example of rolling back a partially completed transaction. By invalidating new memory fragments and setting the commit end bit in the TIS, the transaction is marked as committed with all of the old memory fragments valid, and no new memory fragments left as allocating.

At 606, an application may overwrite data in the file. In some embodiments, this may correspond to an application program requesting that the file system overwrite a portion of the data in the file. At file system operation 616, the flash file system may create memory fragments without validating the new memory fragments. In addition, the flash file system may leave the old data marked as valid. Examples of file system operation 616 are shown in, and described with reference to, FIGS. 2–5. If power were lost with the file system in this state, upon power recovery, an initialization routine may invalidate the new memory fragments and set the commit end bit in the TIS at 624.

At 608, an application may begin to commit a transaction. In some embodiments, this may correspond to an application program issuing a commit begin command or performing a procedure call within an application programming interface. At file system operation 618, the flash file system may set the commit begin bit in the TIS, and then proceed to validate all new memory fragments and invalidate all old memory fragments that are being replaced. If power were lost during the process of committing the changes, upon power recovery, an initialization routine may continue the process of committing the changes. For example, as shown at 626, an initialization routine may validate all new memory fragments, invalidate all old memory fragments that are being replaced, and set the commit end bit in the TIS.

At 610, an application may end the commit process. In some embodiments, this may correspond to an application program issuing a commit end command or performing a procedure call within an application programming interface. At file system operation 620, the flash file system may set the commit end bit in the TIS to signify that the transaction has been committed. In some embodiments, the application does not request both a commit begin at 608 and a commit end at 610. In some of these embodiments, an application may issue a transaction end command, and the operations concerning the commit begin and commit end fields in the TIS are performed by the file system.

Figure 7:
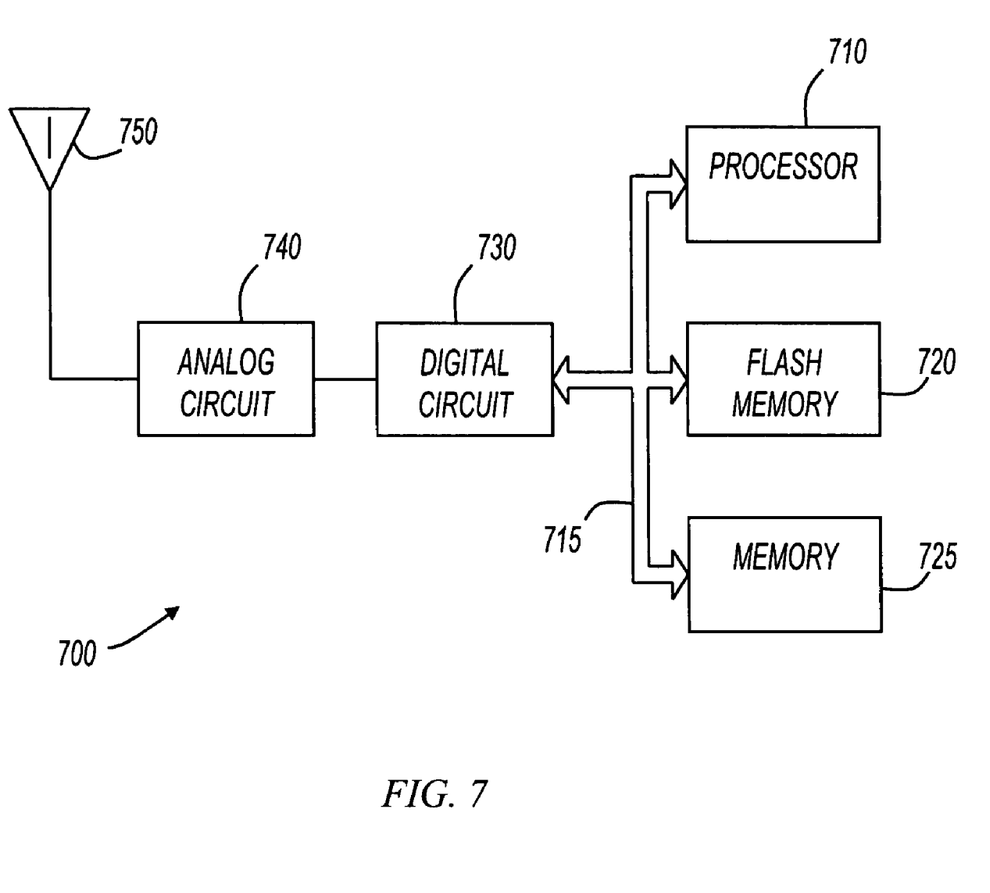
FIG. 7 shows an electronic system in accordance with various embodiments of the present invention.

FIG. 7 shows a system diagram in accordance with various embodiments of the present invention. Electronic system 700 includes processor 710, flash memory 720, memory 725, digital circuit 730, analog circuit 740, and antenna 750. Processor 710 may be any type of processor adapted to perform operations in flash memory 720. For example, in some embodiments, processor 710 maintains a file system in flash memory 720. For example, processor 710 may be a microprocessor, a digital signal processor, a microcontroller, or the like.

Example systems represented by FIG. 7 include cellular phones, personal digital assistants, wireless local area network interfaces, and the like. Flash memory 720 may be adapted to hold information for system 700. For example, flash memory may hold device configuration data, such as contact information with phone numbers, or settings for digital circuit 730 or analog circuit 740. Many other systems uses for flash memory 720 exist. For example, flash memory 720 may be used in a desktop computer, a network bridge or router, or any other system without an antenna.

Analog circuit 740 communicates with antenna 750 and digital circuit 730. In some embodiments, analog circuit 740 includes a physical interface (PHY) corresponding to a communications protocol. For example, analog circuit 740 may include modulators, demodulators, mixers, frequency synthesizers, low noise amplifiers, power amplifiers, and the like. In some embodiments, analog circuit 740 may include a heterodyne receiver, and in other embodiments, analog circuit 740 may include a direct conversion receiver. In some embodiments, analog circuit 740 may include multiple receivers. For example, in embodiments with multiple antennas 750, each antenna may be coupled to a corresponding receiver. In operation, analog circuit 740 receives communications signals from antenna 750, and provides signals to digital circuit 730. Further, digital circuit 730 may provide signals to analog circuit 740, which operates on the signals and then transmits them to antenna 750.

Digital circuit 730 is coupled to communicate with processor 710 and antenna 750. In some embodiments, digital circuit 730 includes circuitry to perform error detection/correction, interleaving, coding/decoding, or the like. Also in some embodiments, digital circuit 730 may implement all or a portion of a media access control (MAC) layer of a communications protocol. In some embodiments, a MAC layer implementation may be distributed between processor 710 and digital circuit 730.

Analog circuit 740 may be adapted to receive and demodulate signals of various formats and at various frequencies. For example, analog circuit 740 may be adapted to receive time domain multiple access (TDMA) signals, code domain multiple access (CDMA) signals, global system for mobile communications (GSM) signals, orthogonal frequency division multiplexing (OFDM) signals, multiple-input-multiple-output (MIMO) signals, spatial-division multiple access (SDMA) signals, or any other type of communications signals. The present invention is not limited in this regard.

Antenna 750 may include one or more antennas. For example, antenna 750 may include a single directional antenna or an omni-directional antenna. As used herein, the term omni-directional antenna refers to any antenna having a substantially uniform pattern in at least one plane. For example, in some embodiments, antenna 750 may include a single omni-directional antenna such as a dipole antenna, or a quarter wave antenna. Also for example, in some embodiments, antenna 750 may include a single directional antenna such as a parabolic dish antenna or a Yagi antenna. In still further embodiments, antenna 750 may include multiple physical antennas. For example, in some embodiments, multiple antennas are utilized to support multiple-input-multiple-output (MIMO) processing or spatial-division multiple access (SDMA) processing.

Memory 725 represents an article that includes a machine readable medium. For example, memory 725 represents a random access memory (RAM), dynamic random access memory (DRAM), static random access memory (SRAM), read only memory (ROM), flash memory, or any other type of article that includes a medium readable by processor 710. Memory 725 may store instructions for performing the execution of the various method embodiments of the present invention.

In operation, processor 710 reads instructions and data from memory 725 and performs actions in response thereto. For example, processor 710 may access instructions from memory 725 and perform transacted file operations in a flash file system held in flash memory 720. In some embodiments, flash memory 720 and memory 725 are combined into a single memory device. For example, flash memory 720 and memory 725 may both be include in a single flash memory device.

Although the various elements of system 700 are shown separate in FIG. 7, embodiments exist that combine the circuitry of processor 710, flash memory 720, memory 725 and digital circuit 730 in a single integrated circuit. For example, memory 725 or flash memory 720 may be an internal memory within processor 710 or may be a microprogram control store within processor 710. In some embodiments, the various elements of system 700 may be separately packaged and mounted on a common circuit board. In other embodiments, the various elements are separate integrated circuit dice packaged together, such as in a multi-chip module, and in still further embodiments, various elements are on the same integrated circuit die.

The type of interconnection between processor 710 and flash memory 720 is not a limitation of the present invention. For example, bus 715 may be a serial interface, a test interface, a parallel interface, or any other type of interface capable of transferring command and status information between processor 710, flash memory 720, and memory 725.

In some embodiments, flash memory 720 may be a NOR-type, and in other embodiments, flash memory 720 may be a NAND-type. Memory cells in flash memory 720 may store one data bit per cell, or memory cells may be multilevel cells (MLC) capable of storing more than one bit per cell. Any flash memory arrangement may be utilized within flash memory 720 without departing from the scope of the present invention.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   writing to a first field in a flash memory device to indicate a transaction starting;
   performing a transaction in the flash memory device, wherein performing a transaction comprises writing a new memory fragment; and
   writing to a second field in the flash memory device to indicate that the transaction should be committed.

2. The method of claim 1 wherein performing a transaction further comprises marking a header corresponding to the new memory fragment to indicate that the new memory fragment is being allocated.

3. The method of claim 2 further comprising marking the header to indicate the new memory fragment is valid.

4. The method of claim 3 further comprising writing to a third field in the flash memory device to indicate that the transaction has been committed.

5. The method of claim 2 wherein the new memory fragment is to replace an old memory fragment.

6. The method of claim 5 further comprising:
   marking the header corresponding to the new memory fragment to indicate that the new memory fragment is valid; and
   marking a header corresponding to the old memory fragment to indicate that the old memory fragment is invalid.

7. The method of claim 6 further comprising writing a third field in the flash memory device to indicate that the transaction has been committed.

8. The method of claim 7 wherein the first, second, and third fields are each a single bit in a flash memory file system.

9. A method comprising:
   beginning a recovery process in a flash memory file system;
   checking a state of a transaction in the flash memory file system; and
   if the transaction had begun but commitment of the transaction had not yet begun, rolling back the transaction.

10. The method of claim 9 wherein rolling back comprises setting a field in the flash memory file system to indicate the transaction had been committed.

11. The method of claim 9 further comprising:
    if commitment of the transaction had begun, committing a remainder of the transaction.

12. The method of claim 11 wherein committing a remainder of the transaction comprises:
    marking as valid fragments that were added in the transaction; and
    marking replaced fragments as invalid.

13. The method of claim 11 further comprising marking the transaction as committed.

14. The method of claim 9 wherein the recovery process comprises a power loss recovery.

15. A flash memory including a transaction information data structure, the transaction information data structure including fields to indicate whether a transaction has begun, whether commitment of the transaction has begun, and whether commitment of the transaction has been completed, wherein the fields are each one bit in length.

16. The flash memory of claim 15 wherein the transaction information data structure is part of a flash memory file system, and the flash memory file system comprises memory fragments and headers associated with the memory fragments.

17. The flash memory of claim 16 wherein each header includes data fields to indicate whether a memory fragment is valid or invalid.

18. The flash memory of claim 16 wherein each header further includes data fields to indicate whether a memory fragment is free or allocating.

19. A flash memory including a transaction information data structure, the transaction information data structure including fields to indicate whether a transaction has begun, whether commitment of the transaction has begun, and whether commitment of the transaction has been completed, wherein the transaction information data structure is part of a flash memory file system that logically divides at least a portion of the flash memory into memory fragments and headers associated with the memory fragments.

20. The flash memory of claim 19 wherein each header includes data fields to indicate whether a memory fragment is valid or invalid.

21. The flash memory of claim 20 wherein each header further includes data fields to indicate whether a memory fragment is free or allocating.

22. An electronic system comprising:
    an antenna;
    an analog circuit coupled to the antenna;
    a digital circuit coupled to the analog circuit; and
    a flash memory coupled to the digital circuit, wherein the flash memory includes a transaction information data structure to support transacted operations in the flash memory, and wherein the transaction information data structure is part of a flash memory file system, and the flash memory file system comprises memory fragments and headers associated with the memory fragments.

23. The electronic system of claim 22 wherein the transaction information data structure includes one bit to signify if a transaction has begun, one bit to signify if commitment of the transaction has begun, and one bit to signify if commitment of the transaction has been completed.

24. The electronic system of claim 22 wherein the headers include fields to indicate whether memory fragments are free, allocating, valid, or invalid.

* * * * *

UNITED STATES PATENT AND TRADEMARK OFFICE
CERTIFICATE OF CORRECTION

| | | |
|---|---|---|
| PATENT NO. | : 7,139,199 B2 | Page 1 of 1 |
| APPLICATION NO. | : 10/878237 | |
| DATED | : November 21, 2006 | |
| INVENTOR(S) | : Srinivasan et al. | |

It is certified that error appears in the above-identified patent and that said Letters Patent is hereby corrected as shown below:

In column 9, line 6, In Claim 1, after "writing" insert -- to --.

Signed and Sealed this

Twenty-seventh Day of February, 2007

JON W. DUDAS
*Director of the United States Patent and Trademark Office*